(12) United States Patent
Koyama et al.

(10) Patent No.: US 11,128,400 B2
(45) Date of Patent: Sep. 21, 2021

(54) BIT ASSIGNMENT ESTIMATING DEVICE, BIT ASSIGNMENT ESTIMATING METHOD, AND PROGRAM

(71) Applicant: NIPPON TELEGRAPH AND TELEPHONE CORPORATION, Chiyoda-ku (JP)

(72) Inventors: Takuma Koyama, Musashino (JP); Masashi Tanaka, Musashino (JP); Yasushi Okano, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 16/761,833

(22) PCT Filed: Nov. 14, 2018

(86) PCT No.: PCT/JP2018/042081
§ 371 (c)(1),
(2) Date: May 6, 2020

(87) PCT Pub. No.: WO2019/107149
PCT Pub. Date: Jun. 6, 2019

(65) Prior Publication Data
US 2021/0203444 A1    Jul. 1, 2021

(30) Foreign Application Priority Data
Dec. 1, 2017 (JP) .............................. JP2017-231762

(51) Int. Cl.
*H04L 1/00* (2006.01)
*H04L 1/16* (2006.01)

(52) U.S. Cl.
CPC .......... *H04L 1/0057* (2013.01); *H04L 1/0065* (2013.01); *H04L 1/0084* (2013.01); *H04L 1/1614* (2013.01)

(58) Field of Classification Search
CPC ... H04L 1/0057; H04L 1/0065; H04L 1/0084; H04L 1/1614
See application file for complete search history.

(56) References Cited

U.S. PATENT DOCUMENTS 9,900,248 B2 * 2/2018 Nickel .................... H04L 45/74
2012/0324320 A1 * 12/2012 Terabe .................... G06F 11/10
714/807

(Continued)

OTHER PUBLICATIONS

International Search Report dated Dec. 18, 2018 in PCT/JP2018/042081 filed on Nov. 14, 2018, 1 page.

(Continued)

*Primary Examiner* — Kyle Vallecillo
(74) *Attorney, Agent, or Firm* — Oblon, McClelland, Maier & Neustadt, L.L.P.

(57) ABSTRACT

A bit assignment estimating device that accurately estimates bit assignment of a payload with fewer division patterns is provided. The bit assignment estimating device: divides a payload of received communication data to generate a plurality of blocks; estimates bit assignment of a block to be a certain value type; concatenates a block, which is adjacent to either of a block or a concatenation block which is estimated to be the continuous value type at a higher-order bit side, to the block or the concatenation block which is estimated to be the continuous value type when the block adjacent is estimated to be the status value type or the continuous value type; estimates whether the concatenation block is the continuous value type or not; and separates an immediately-close-concatenated block from a correspond- (Continued)

ing concatenation block when the concatenation block is estimated not to be the continuous value type.

20 Claims, 6 Drawing Sheets

(56) References Cited

U.S. PATENT DOCUMENTS

| | | | | |
|---|---|---|---|---|
| 2013/0086436 A1* | 4/2013 | Antoniucci | ....... | H04L 12/40169 714/49 |
| 2013/0137415 A1* | 5/2013 | Takikawa | ................ | H04W 4/48 455/418 |
| 2014/0129748 A1* | 5/2014 | Muth | ....................... | G06F 13/42 710/106 |
| 2014/0129900 A1* | 5/2014 | Hartwich | ............ | G06F 13/4282 714/758 |
| 2014/0201410 A1* | 7/2014 | Hartwich | .............. | H04L 1/0083 710/116 |
| 2014/0274226 A1* | 9/2014 | Pandya | .................. | G07C 5/008 455/574 |
| 2015/0095532 A1* | 4/2015 | Muth | .................. | H04L 12/4135 710/105 |
| 2015/0095711 A1* | 4/2015 | Elend | .................. | G06F 13/4072 714/39 |
| 2015/0296376 A1* | 10/2015 | Mabuchi | ............... | H04W 12/04 380/270 |
| 2018/0139072 A1* | 5/2018 | Komano | ............... | H04L 9/0819 |
| 2019/0116157 A1* | 4/2019 | Kishikawa | .......... | H04L 63/1466 |
| 2020/0213340 A1* | 7/2020 | Hamada | .............. | H04L 63/1425 |

OTHER PUBLICATIONS

Kishikawa et al., "A Generic CAN Message Field Extraction Method to Construct Anomaly Detection Systems for In-Vehicle Networks," The Institute of Electronics, Information and Communication Engineers, 2017 Symposium on Cryptography and Information Security, pp. 1-8 , Jan. 2017 (with English Abstract and partial English translation) (total 12 pages).

Moti Markovitz et al., "Field classification, modeling and anomaly detection in unknown CAN bus networks", Vehicular Communications 9 (2017), pp. 43-52.

Adrian Taylor, "Anomaly-based detection of malicious activity in in-vehicle networks", Ottawa, Canada, 2017.

* cited by examiner

BIT ASSIGNMENT ESTIMATING DEVICE, BIT ASSIGNMENT ESTIMATING METHOD, AND PROGRAM

TECHNICAL FIELD

The present invention relates to a bit assignment estimating device, a bit assignment estimating method, and a program for estimating bit assignment (type) of a payload included in communication data, in a network incorporated into machinery such as vehicles, machine tools, construction equipment, and agricultural machinery, a communication device connected to the network, and a communication system configured therewith.

BACKGROUND ART

A plurality of electronic control units (ECUs) are incorporated into some machinery such as vehicles (for example, automobiles, special-purpose vehicles, motorcycles, and bicycles), machine tools, construction equipment, and agricultural machinery, and Controller Area Network (CAN) is a representative example that is used in a communication network among these ECUs. The network configuration of CAN is what is called a bus-type configuration in which a communication line of each ECU is shared. As a communication procedure on the bus of the ECUs, carrier sense multiple access/collision resolution (CSMA/CR), that is, a procedure by which, when a communication collision occurs, a communication of higher priority is not affected by the collision but a communication of lower priority is resent is used. A communication of each ECU on CAN includes an ID, and the ID is used for identification of, for example, the priority of communication arbitration, contents of a payload, and a transmission node. The length of a payload is defined in increments of 1 byte from 1 byte to 8 bytes for every ID, and a designer can freely designate contents of a payload.

The risk of cyberattacks on these vehicle equipment communication networks is suggested. It is known that attack transmission with an ID related to a function to be attacked is inserted by means such as connecting an unauthorized ECU to the network or unauthorized alteration of operation of the existing ECU, which can cause unauthorized operation of the function to be attacked.

As a method for detecting these attack communications, a method for detecting an anomaly by monitoring a payload has been proposed. In order to improve detection accuracy in this method, it is important to analyze contents of a payload and grasp a normal state. There is Non-patent Literature 1, for example, as a method for grasping contents of a payload of CAN. The method is a method for estimating bit assignment (a kind of type such as a fixed value and a variable of a counter or a checksum, for example) of a payload based on normal communication. In the case of CAN, a plurality of types may be included in one payload. Accordingly, a division pattern representing the number of bits and the number of types of a payload is estimated and a kind of a type of each divided part (referred to as a field) is estimated. In related art, a plurality of statistics are calculated for fields of all possible division patterns and candidates of a division pattern are selected depending on whether each statistic is consistent with type determination criteria. When a certain division pattern can be estimated to be a certain type, inconsistent division patterns are excluded from the candidates, and then whether the rest of the division patterns are consistent with another type is confirmed. This procedure is repeated for all types. One finally-remaining division pattern and a kind of a type of each field obtained through division are an estimation result.

PRIOR ART LITERATURE

Non-Patent Literature

Non-patent Literature 1: Takeshi Kishikawa, Manabu Maeda, Junichi Tsurumi, Tomoyuki Haga, Ryota Takahashi, Takamitsu Sasaki, Jun Anzai, Hideki Matsushima, "A generic CAN message field extraction method to construct anomaly detection systems for in-vehicle networks", SCIS2017-Symposium on Cryptography and Information Security, 2017

SUMMARY OF THE INVENTION

Problems to be Solved by the Invention

First, the related art requires calculation of statistics for all possible division patterns. In the case of CAN, there are $$\Sigma_{i=1}^{64} i = 2080$$

kinds of division patterns for an ID having an 8-byte (64-bit) payload, for example. Examples of a division pattern include a pattern in which 64 pieces of 1-bit length fields are connected and a pattern which is composed of one piece of 64-bit length field. The related art calculates statistics such as the number of kinds of values obtained for all division patterns, variance of change amounts obtained when values are changed, and a change rate of values, but fields of many division patterns are overlapped, causing repeated calculation of the same statistics and requiring much time and labor. It is assumed that higher-order 4 bits are fixed values and lower-order 4 bits are variables in a correct estimation result for an ID having an 8-bit payload, for example. The related art calculates the number of values taken by all division patterns, variance of change amounts of the values, a rate of the change, and the like. Especially, five kinds of statistics have identical values when each of lower-order 4, 5, 6, 7, and 8 bits is regarded to be one field.

Next, when fields are classified based on a characteristic in presence of value change, the fields are roughly classified into two kinds: a constant (fixed value type) and a variable type. The variable type can be subdivided depending on a characteristic of the change. The related art has defined four kinds of variable types, but there is a problem in that each variable type is erroneously estimated to be a status value type therein.

The variable type in the related art has four kinds: a continuous value type, a counter type, a checksum value type, and a status value type. As for the continuous value type, a value successively changes, such as a physical amount acquired from a sensor. As for the counter type, a value is incremented every communication and thus a value successively changes. As for the checksum value type, a value is derived from another field in accordance with a predetermined algorithm and is used in error detection or the like. As for the status value type, a vehicle status, such as a shift position, a flag, and the like are represented. The related art sequentially estimates whether each field is the fixed value type, whether each field is the counter type, whether each field is the continuous value type, whether each field is the checksum value type, and whether each field satisfies conditions based on statistics of a division pattern, and all remaining fields which cannot be estimated are assumed to be the status value type. That is, the related art does not directly estimate whether a field is the status value type or not, but the related art estimates remaining fields, which cannot be estimated to be other types, to be the status value type by a process of elimination. Accordingly, the related art sometimes erroneously estimates types, which are the continuous value type, the counter type, and the checksum value type, having different variable characteristics to be the status value type. In order to perform anomaly detection based on contents of a payload, it is required to accurately estimate a characteristic of each field and to more appropriately think out a field estimation procedure and field estimation criteria.

An object of the present invention is to provide a bit assignment estimating device that is capable of accurately estimating bit assignment of a payload with fewer division patterns compared to the related art.

Means to Solve the Problems

A bit assignment estimating device according to the present invention estimates bit assignment of a payload included in communication data of each electronic control unit in a communication network. The bit assignment estimating device according to the present invention includes a receiving unit, a block generation unit, a unit block bit assignment estimation unit, a block concatenation unit, a concatenation block bit assignment estimation unit, and a block separation unit.

The receiving unit receives the communication data. The block generation unit divides the payload of the communication data, which is received, by every predetermined fixed bit length so as to generate a plurality of blocks. The unit block bit assignment estimation unit estimates the bit assignment of the block to be any one of a fixed value type, a status value type, and a continuous value type based on a statistic of each block. The block concatenation unit concatenates a block, which is adjacent to either of the block which is estimated to be the continuous value type or a concatenation block which is obtained by concatenating a plurality of adjacent blocks and estimated to be the continuous value type at a higher-order bit side, to the block or the concatenation block, which is estimated to be the continuous value type, when the block adjacent is estimated to be the status value type or the continuous value type. The concatenation block bit assignment estimation unit estimates whether the concatenation block is the continuous value type or not based on a statistic of each concatenation block. The block separation unit separates an immediately-close-concatenated block from a corresponding concatenation block when the concatenation block is estimated not to be the continuous value type.

Effects of the Invention

The bit assignment estimating device according to the present invention is capable of accurately estimating bit assignment of a payload with fewer division patterns compared to the related art.

DETAILED DESCRIPTION OF THE EMBODIMENTS

Figure 1:
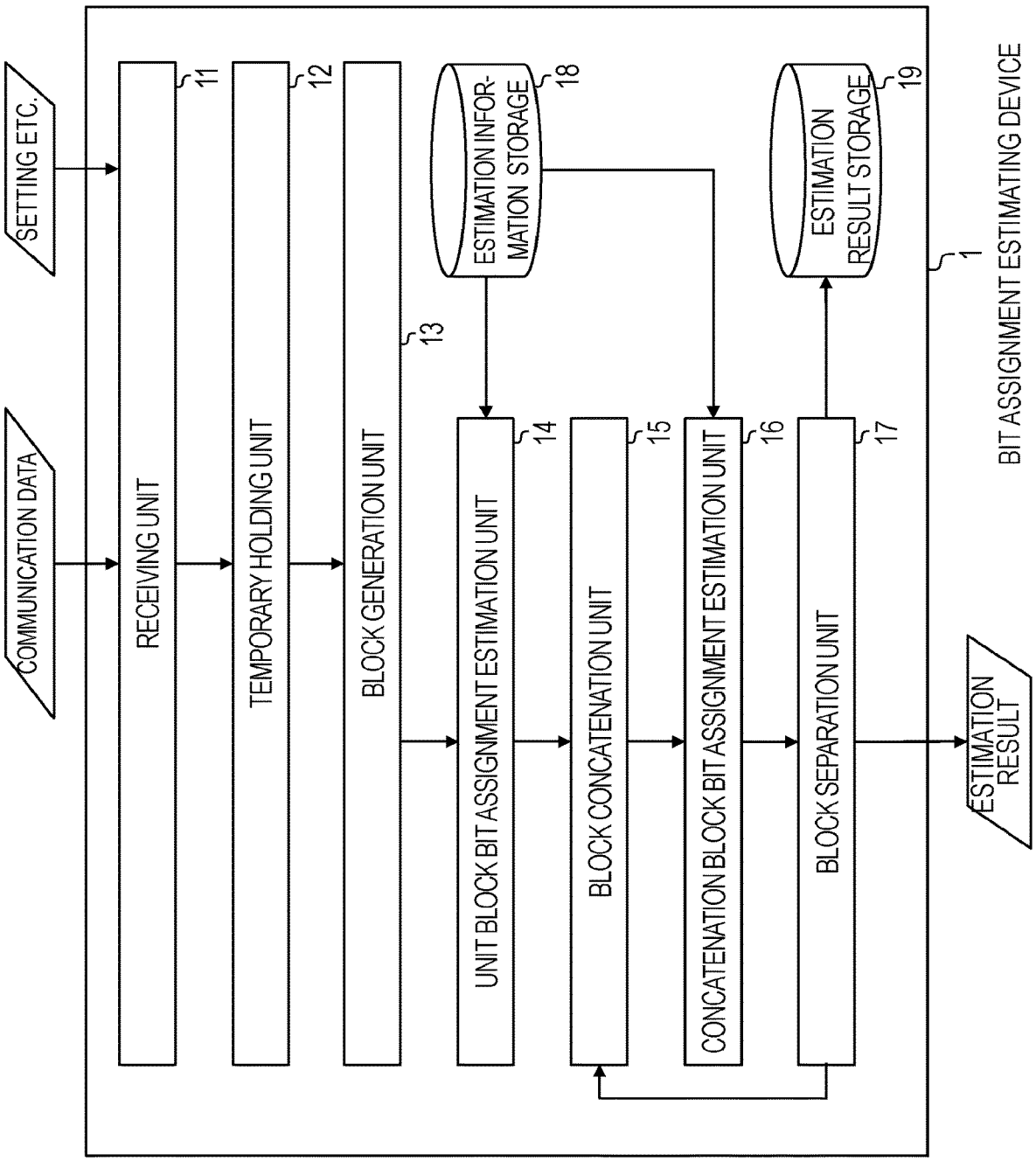
FIG. 1 is a block diagram illustrating the configuration of a bit assignment estimating device according to a first embodiment.

Embodiments of the present invention are described in detail below. Here, components having the mutually-same functions are given the same reference characters and duplicate description thereof is omitted.

First Embodiment

Figure 2:
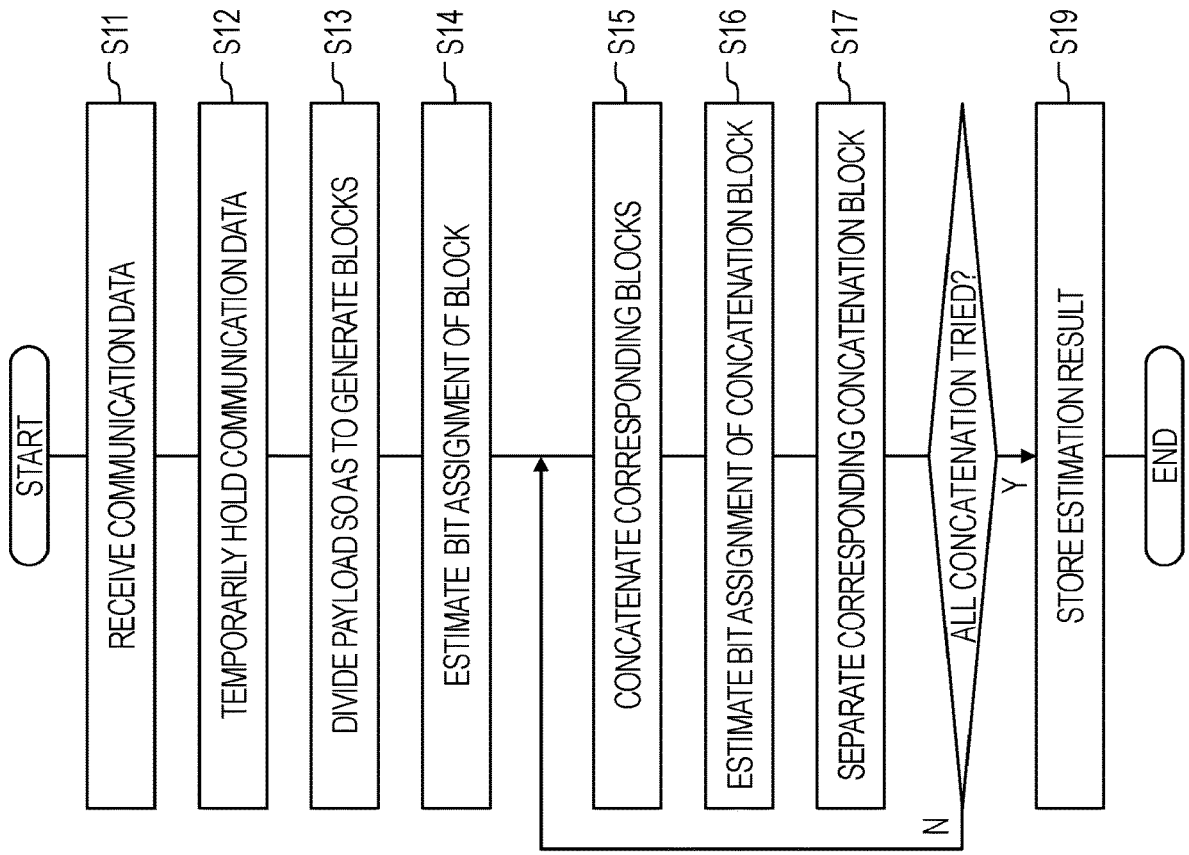
FIG. 2 is a flowchart illustrating an operation of the bit assignment estimating device according to the first embodiment.

The configuration of a bit assignment estimating device according to a first embodiment is described below with reference to FIG. 1. As illustrated in FIG. 1, a bit assignment estimating device 1 of the present embodiment includes a receiving unit 11, a temporary holding unit 12, a block generation unit 13, a unit block bit assignment estimation unit 14, a block concatenation unit 15, a concatenation block bit assignment estimation unit 16, a block separation unit 17, an estimation information storage 18, and an estimation result storage 19. An operation of each component is described below with reference to FIG. 2.

Receiving Unit 11

The receiving unit 11 receives communication data of each electronic control unit on a vehicle equipment communication network or communication data generated by communication processing or the like (S11).

Temporary Holding Unit 12

The temporary holding unit 12 holds all received payloads while holding a reception order for every TD (S12).

Block Generation Unit 13

Figure 3:
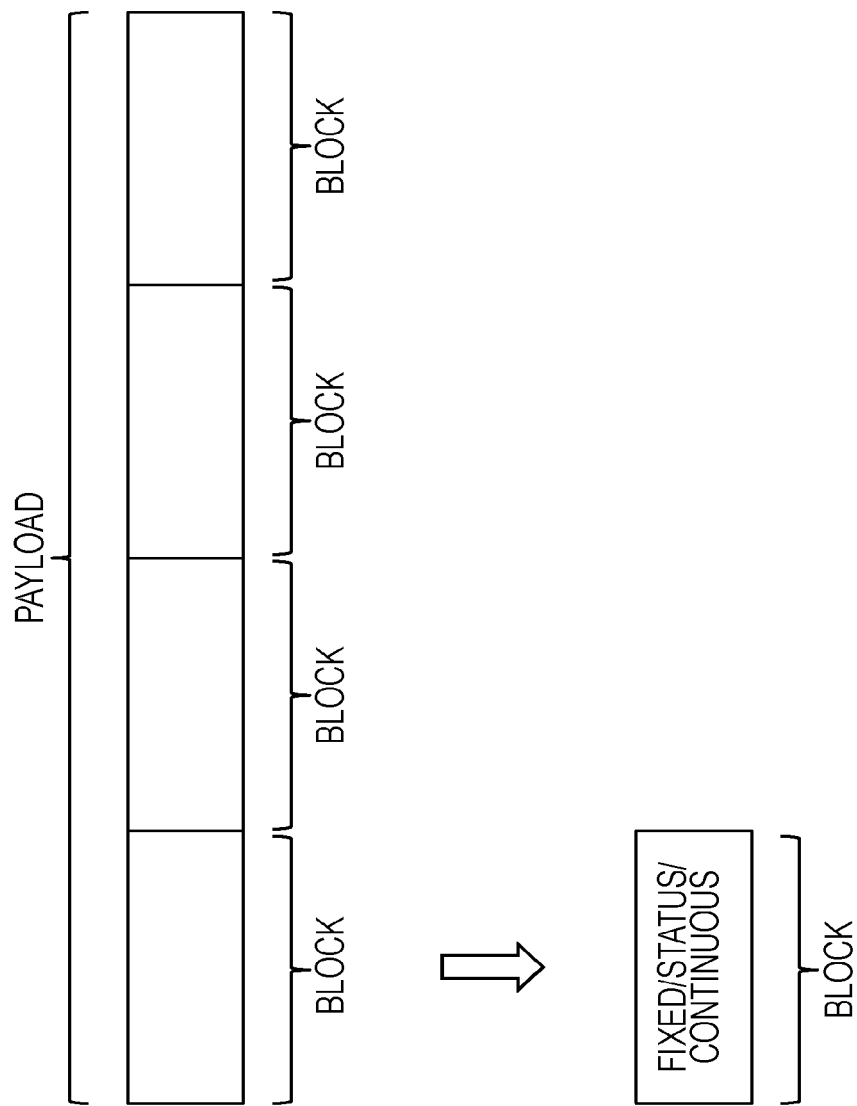
FIG. 3 is a diagram for explaining steps S13 and S14 in a bit assignment estimating method according to the first embodiment.

The block generation unit 13 divides a payload of received communication data by every predetermined fixed bit length so as to generate a plurality of blocks (S13, see FIG. 3). In the case of CAN, any one of 1, 2, 4, and 8 bits which are divisors of 8 bits being the minimum bit length is defined as a block length. For example, when the block length is defined as 8 bits and the bit length of a payload of a certain ID is 64 bits, the block generation unit 13 divides the payload into eight pieces of 8-bit blocks. Statistics of the generated blocks are calculated by the later-described processing. The blocks generated in step S13 are not mutually overlapped, so that the number of times of statistic calculation can be reduced.

Unit Block Bit Assignment Estimation Unit 14

The unit block bit assignment estimation unit 14 calculates statistics for every block and estimates bit assignment of a block to be any one of a fixed value type, a status value type, and a continuous value type based on the statistics of each block (S14, see FIG. 3).

Estimation Method for Fixed Value Type

The unit block bit assignment estimation unit 14 first estimates whether each block is the fixed value type or not. The unit block bit assignment estimation unit 14 calculates the number of kinds $uniq_i$ of unique values of each block as a statistic based on interception of normal communication or a data string of individual IDs which are obtained in advance by interception. i denotes the high-order i-th block. It is assumed that only a value of $uniq_1$ is 1, for example. In this case, it can be estimated that the highest-order one block of a payload takes only one kind of value, that is, the fixed value type.

Estimation Method for Status Value Type and Continuous Value Type

The unit block bit assignment estimation unit 14 next estimates whether the remaining blocks are the status value type or the continuous value type. The unit block bit assignment estimation unit 14 calculates two statistics which are a rate $changing\_rate_i$ of the number of changing times of a value of each block with respect to the total number of messages and variance $var_i$ of differences of change amounts obtained in change, for example. In general, there is a tendency in which uniq and changing_rate of the continuous value type are larger than those of the status value type and var of the continuous value type is smaller than that of the status value type. The unit block bit assignment estimation unit 14 refers to a threshold value which is set for at least any one of uniq, changing_rate, and var based on this tendency so as to estimate each block to be the status value type or the continuous value type. Arbitrary methods may be employed as methods for setting each threshold value and weighting each statistic as a basis for determination. For example, clustering using values of uniq, changing_rate, and var of each block as feature amounts is performed so as to define a threshold value for classifying each block to either of two kinds: the status value type and the continuous value type. An appropriate method such as a parameter estimation method for normal mixture distribution, the K-means method, and an estimation method based on a non-parametric Bayesian model may be employed for clustering. Also, when there is prior knowledge related to a target ID, a threshold value may be set based on the prior knowledge. As described above, the prior art employs a procedure in which "other values which have not been able to be estimated" are assigned to the status value type by a process of elimination. However, the present method does not employ such a procedure but employs a procedure to directly estimate a block having a characteristic of the status value type to be the status value type by using a threshold value and the like. According to the present method, a threshold value is set for a value of uniq, being able to estimate the status value type in further divided manner depending on the number of kinds of the number of statues.

Detailed Estimation Method for Continuous Value Type

Subsequently, the unit block bit assignment estimation unit 14 subdivides the continuous value type into an unsigned continuous value type, a signed continuous value type, a counter value type, a checksum value type, and the like, depending on a characteristic of value change of the continuous value type.

A signed continuous value is a variable that the highest-order bit of a block is a sign representing whether the value is positive or negative. On the other hand, an unsigned continuous value is a variable that the highest-order bit of a block is not a sign but represents a value. A counter value is a variable whose value monotonically increases (or monotonically decreases), does not change with any trigger, and returns to an initial value when reaching the upper limit value (or the lower limit value). A checksum value is a variable that is derived from another field in accordance with a predetermined algorithm and is used for error detection or the like. These types belonging to the continuous value type can be also classified by appropriately setting a threshold value and the like, as is the case with the procedure for classification to the status value type and the continuous value type based on a threshold value and the like. In subdivision of the continuous value type, not only var but also a change amount between messages used for the calculation of var is used for classification determination.

For example, constant increase (or decrease) is repeated other than when returning from a limit value to an initial value in the counter value type, so that var tends to be smaller than that of other continuous value types. Therefore, var is very small, and when a value largely changes over a certain threshold value based on var, the change amount is substantially equal to the maximum of a block. When such large change regularly occurs, the value may be estimated to be a counter value.

An unsigned continuous value has a tendency in which var thereof is smaller than that of a signed continuous value and a checksum value, the value merely changes from the maximum to the minimum by one message unlike a counter value, and both of increase and decrease of the value occur unlike a counter value.

On the other hand, a signed continuous value has a tendency in which the value largely changes in sign inversion and the change amount is substantially equal to the maximum of a block, further, var thereof is larger than that of a counter value and an unsigned continuous value, and both of increase and decrease of the value occur. When the block length is b bits, the unit block bit assignment estimation unit 14 calculates the following statistics so as to estimate whether or not a focused block includes signed continuous values. The unit block bit assignment estimation unit 14 adds $2^{(b-1)}$ to all values appearing in the block and divides the obtained values by $2^b$ to obtain remainders. The unit block bit assignment estimation unit 14 calculates var for a data string of the remainders. Accordingly, a negative/positive base of the signed continuous values can be changed from value zero to approximately value $2^{(b-1)}$, eliminating rapid change of a value caused by sign inversion. The unit block bit assignment estimation unit 14 checks whether a behavior of the values of the data string of the remainders changes into a behavior (var) as that of an unsigned continuous value or not after the above-described processing. When var of the data string of the remainders can be regarded to be that of unsigned continuous values, the unit block bit assignment estimation unit 14 estimates the focused block to include signed continuous values.

Last, when var of values of the focused block is large as that of signed continuous values and var of the above-mentioned data string of the remainders cannot be also regarded as unsigned continuous values in calculation of the data string of the remainders, the unit block bit assignment estimation unit 14 estimates the focused block to include checksum values. Further, a checksum value tends to be positioned in the last (lowest-order) block of a payload because of its characteristic, so that the unit block bit assignment estimation unit 14 may appropriately set a threshold value by using this tendency and the like so as to classify types belonging to the continuous value type depending on respective characteristics in value change.

The unit block bit assignment estimation unit 14 may calculate statistic information for estimation results of respective blocks and may store the statistic information with the estimation results in a predetermined storage region. Statistic information includes values of uniq, changing_rate, and var of each block, and an average value, a median, a most frequent value, variance of values, skewness, and kurtosis of distribution of values for each block, for example.

Block Concatenation Unit 15

Figure 4:
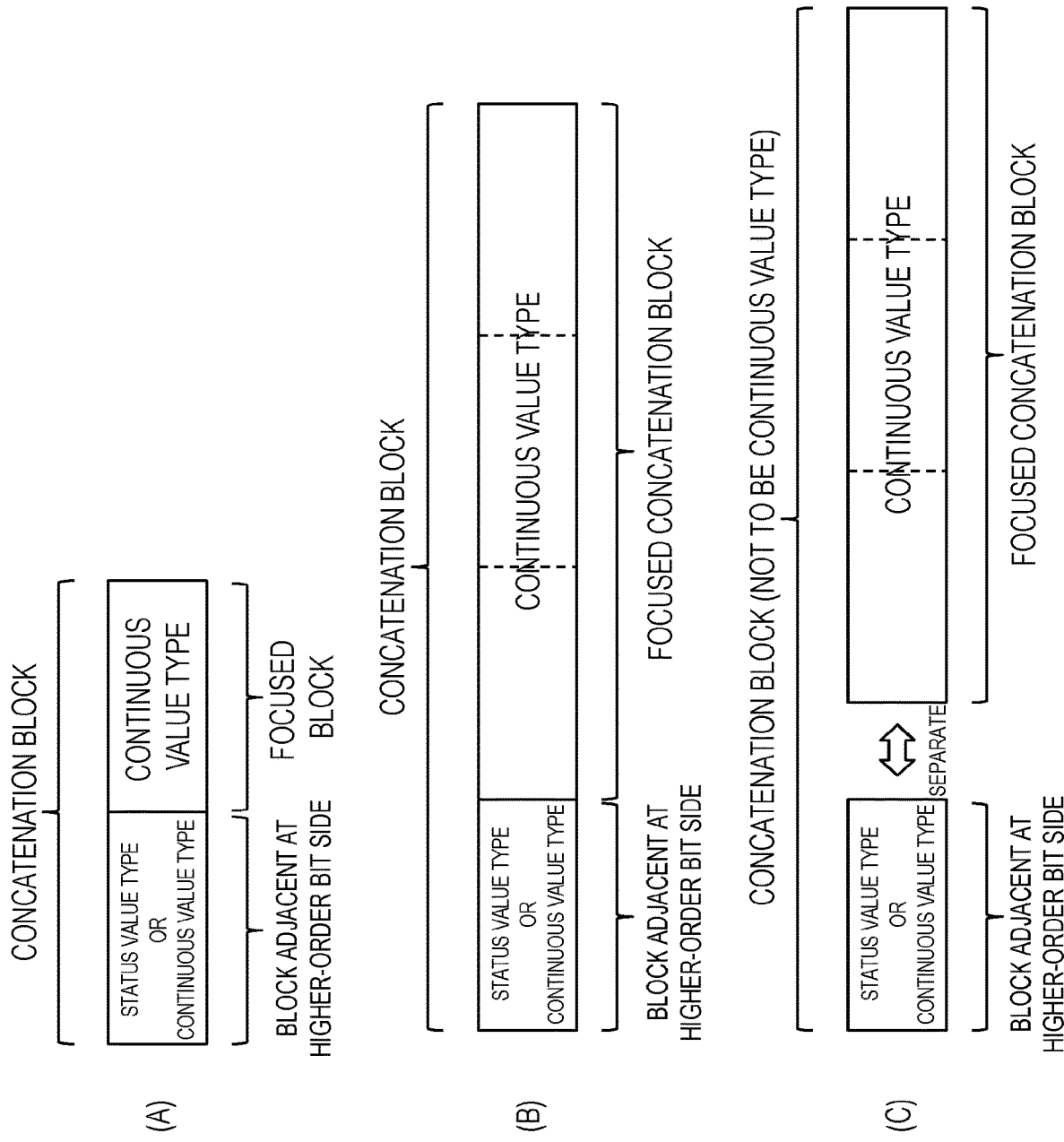
FIG. 4 is a diagram for explaining steps S15, S16, and S17 in the bit assignment estimating method according to the first embodiment.

As illustrated in FIG. 4(A), when a block that is adjacent to a block, which is estimated to be the continuous value type, at the higher-order bit side is estimated to be other than the fixed value type (that is, the status value type or the continuous value type), the block concatenation unit 15 concatenates this adjacent block to the block which is estimated to be the continuous value type so as to generate a concatenation block (a block obtained by concatenating a plurality of adjacent blocks) (S15).

Further, as illustrated in FIG. 4(B), when a block that is adjacent to a concatenation block, which is estimated to be the continuous value type, at the higher-order bit side is estimated to be other than the fixed value type (that is, the status value type or the continuous value type), the block concatenation unit 15 concatenates the adjacent block to the concatenation block which is estimated to be the continuous value type (S15).

On the other hand, when a block that is adjacent to a block estimated to be the continuous value type or a concatenation block estimated to be the continuous value type at the higher-order bit side is estimated to be the fixed value type, the block concatenation unit 15 estimates this adjacent block to be independent from the block or the concatenation block estimated to be the continuous value type and maintains results estimated for respective blocks without performing concatenation.

Concatenation Block Bit Assignment Estimation Unit 16

The concatenation block bit assignment estimation unit 16 estimates whether a concatenation block is the continuous value type or not based on statistics for every concatenation block (S16). For example, the concatenation block bit assignment estimation unit 16 regards concatenated two blocks as a concatenation block as illustrated in FIG. 4(A) and calculates statistics for the concatenation block to estimate its type. In this case, the concatenation block bit assignment estimation unit 16 calculates at least one of uniq, changing_rate, and var of the two-block length of concatenation block, and when the whole of the concatenation block can be regarded as the continuous value type based on a threshold value set for at least one of uniq, changing_rate, and var, the concatenation block bit assignment estimation unit 16 estimates the two-block length of concatenation block to be one continuous value type (a type belonging to the continuous value type).

Further, in the state in which a higher-order block is estimated to be the status value type, a lower-order block is estimated to be the unsigned continuous value type, and a two-block length of concatenation block is generated by concatenating these two blocks, if the whole of the concatenation block can be regarded as the continuous value type, the concatenation block bit assignment estimation unit 16 estimates the whole of the two-block length of concatenation block to be the unsigned continuous value type.

When changing_rate of a two-block length of concatenation block is equal to that of a one-block length of signed continuous value type block and var of the concatenation block is larger than that of the one-block length of signed continuous value type block, the concatenation block bit assignment estimation unit 16 estimates the whole of the two-block length of concatenation block to be the signed continuous value type or two independent one-block length of blocks. When the block length is b bits, the concatenation block bit assignment estimation unit 16 adds $2^{(b-1)}$ to all values obtained when regarding as a two-block length and divides the obtained values by $2^b$ to obtain remainders. The concatenation block bit assignment estimation unit 16 calculates var for a data string of these remainders. When a value of var of the data string of the remainders is smaller than a value of var of the original two blocks, the concatenation block bit assignment estimation unit 16 estimates the two-block length of concatenation block to be the signed continuous value type, and the concatenation block bit assignment estimation unit 16 estimates the two-block length of concatenation block to be two independent one-block length of blocks in other cases.

Block Separation Unit 17

As illustrated in FIG. 4(C), when a concatenation block is estimated not to be the continuous value type, the block separation unit 17 separates an immediately-close-concatenated block from the corresponding concatenation block (S17) and determines estimation that a type of a block or a concatenation block on a lower-order side is the continuous value type.

Estimation Information Storage 18

Threshold values and models which are used for estimating a type of each block are stored in the estimation information storage 18. These threshold values and models may be calculated/updated by the bit assignment estimating device 1 during estimation or may be preliminarily stored in the estimation information storage 18 before estimation.

Recursive Type Estimation

The bit assignment estimating device 1 sequentially executes steps S15 to S17 from the lowest-order bit block toward a higher-order bit block. The bit assignment estimating device 1 executes recursive type estimation by repeatedly executing steps S15 to S17. For example, when the whole of the two-block length of concatenation block is estimated to be the continuous value type (a type belonging to the continuous value type) in step S16 and further, there is a block which is estimated to be other than the fixed value type on the immediate left, concatenation is executed in step S15 to generate a three-block length of concatenation block. Then, when the whole of the three-block length of concatenation block is estimated to be the continuous value type in step S16 again and further, there is a block which is estimated to be other than the fixed value type on the immediate left, concatenation is executed in step S15 to generate a four-block length of concatenation block. When a block on the immediate left is the fixed value type, recursive type estimation is restarted from a block on the higher-order than the block on the immediate left. If there are no blocks on the immediate left, the bit assignment estimating device 1 stops the recursive type estimation. At the end, one certain kind of payload having a combination of any one of the fixed value type, the status value type, and the continuous value type is determined. The bit assignment estimating device 1 stores the final estimation result in the estimation result storage 19 (S19).

Among the above-described steps S15 to S17, the highest number of times of statistic calculation is required when all blocks are estimated to be the continuous value type in the first estimation for every one-block length (S14), for example. All adjacent blocks are estimated in a concatenated manner, so that the number of times is 8+7=15 times when a payload is 8 bytes and a block has the 8-bit length, and the number of times is 64+63=127 times when a payload is 8 bytes and a block has the 1-bit length, for example.

Among the above-described steps S15 to S17, the lowest number of times of statistic calculation is required when all blocks are estimated to be the fixed value type or the status value type in the first estimation for every one-block length (S14). In this case, the number of times is 8 times when a payload is 8 bytes and a block has the 8-bit length, and the number of times is 64 times when a payload is 8 bytes and a block has the 1-bit length, for example. A bit length of a certain ID is denoted as a and the block length is denoted as b. In related art, $$\Sigma_{i=1}^{a} i = a \times (a+1)/2$$

times of statistic calculation is performed. On the other hand, in steps S15 to S17 in the present embodiment, ($x|a/b \le x \le a/b + a/b - 1$) times of statistic calculation is performed. x is constantly equal to or smaller than $a \times (a+1)/2$. That is, the number of times of statistic calculation is equal to or smaller than the number of times of calculation of related art no matter which block length is selected.

The procedure in which adjacent blocks are concatenated and re-estimated as described above can reduce a possibility for erroneously estimating a type of a block. For example, when a part of a payload which is originally the two-block length continuous value type is divided into each one block, values of changing_rate and var of the higher-order one block are smaller than those of the lower-order one block. This is because value change of the higher-order block is slower than value change of the lower-order block. Thus, values of changing_rate and var of the higher-order one block in the two-block length continuous value type tend to be smaller, so that there is a case where the higher-order one block is erroneously estimated to be the status value type in step S14. Even in such to a case, when the lower-order block can be estimated to be the continuous value type, concatenation is executed in step S15 and a type of the whole concatenation block is re-estimated in step S16, being able to correct the above-described erroneous estimation.

Second Embodiment

Message transmission timing is not defined in CAN and each piece of equipment is allowed to perform transmission at timing set therein. Transmission periods can be classified into four kinds depending on difference in transmission timing. These are (1) an ID which is transmitted at a constant period, (2) an ID which is transmitted at a constant period under normal conditions, but transmitted in a shorter interval (or a longer interval) than the constant period only at the time with a certain trigger and then transmitted at the original constant period, (3) an ID which is transmitted at a constant period under normal conditions, but transmitted in a shorter interval than the constant period only at the time with a certain trigger and whose transmission interval of the constant period does not change, and (4) an ID which is not transmitted at a constant period but sporadically transmitted only at the time with a certain trigger. In a bit assignment estimating device according to a second embodiment, a method for setting each threshold value used for estimating a type of a payload is changed in consideration of the above-described difference in characteristics of transmission periods.

Figure 5:
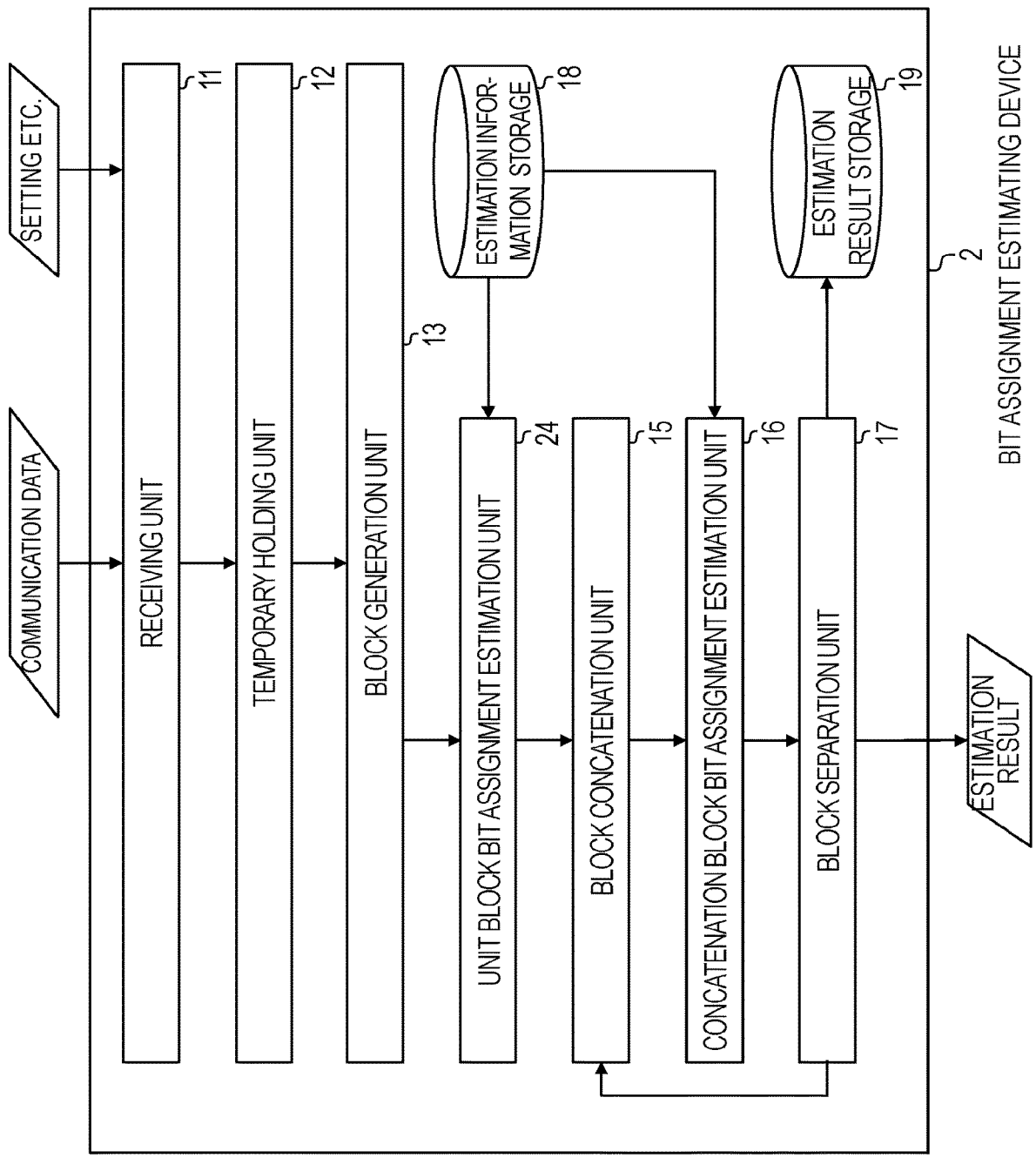
FIG. 5 is a block diagram illustrating the configuration of a bit assignment estimating device according to a second embodiment.

As illustrated in FIG. 5, a bit assignment estimating device 2 of the present embodiment includes a receiving unit 11, a temporary holding unit 12, a block generation unit 13, a unit block bit assignment estimation unit 24, a block concatenation unit 15, a concatenation block bit assignment estimation unit 16, a block separation unit 17, an estimation information storage 18, and an estimation result storage 19, and the configuration of the bit assignment estimating device 2 is the same as that of the first embodiment other than the unit block bit assignment estimation unit 24.

Figure 6:
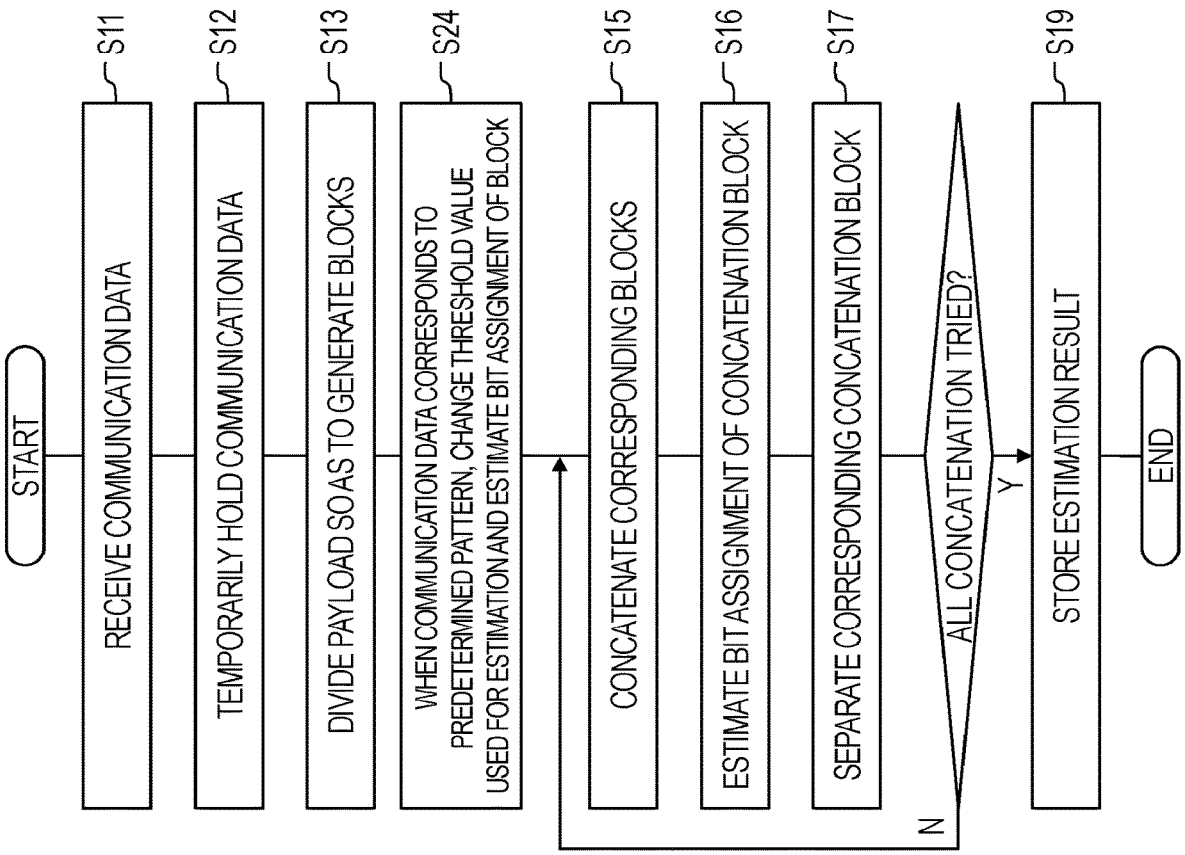
FIG. 6 is a flowchart illustrating an operation of the bit assignment estimating device according to the second embodiment.

As illustrated in FIG. 6, when a transmission period of received communication data corresponds to a predetermined pattern, the unit block bit assignment estimation unit 24 changes a threshold value used for estimation so as to make it easier for a corresponding block to be estimated as the status value type, and estimates bit assignment of the block (S24).

For example, in the case of IDs having the patterns of the transmission periods (2), (3), and (4), a message is transmitted at timing deviated from a constant period in response to a trigger of the inside or outside of equipment, so that it can be estimated that a payload may include some status value type representing the trigger. Therefore, when a transmission period of an ID of an estimation object has been estimated or confirmed to be any one of the transmission periods (2), (3), and (4) with an arbitrary method, the unit block bit assignment estimation unit 24 changes a threshold value used for estimation into an appropriate value so as to make it easier for the corresponding block to be estimated to be the status value type in a procedure for estimating whether the block is the status value type or the continuous value type.

About Accordance and Discordance Between Estimation Result and Manufacturer's Specification The above-described bit assignment estimating devices are aimed to be applied to analyze contents of a payload and estimate a normal state for improvement in detection accuracy in the anomaly detection technique.

That is, what is important for detection accuracy improvement in the anomaly detection technique is that a behavior of a payload having a certain division length can be accurately estimated, and whether or not the division length is accorded with that of manufacture's specifications does not always contribute to accuracy improvement. Accordingly, it is not a prerequisite that cuts in division of a payload based on an estimation result of the bit assignment estimating device are accorded with specifications for payloads defined by a manufacturer.

For example, it is assumed that when a manufacture defines an 8-bit payload composed of two 4-bit status value type fields, the bit assignment estimating device according to the embodiments estimates the payload to be a payload composed of one 8-bit status value type field. In this case, the bit assignment estimating device according to the embodiments has not been able to obtain an estimation result accorded with that in the manufacture's specifications. However, if the behavior of the field is still that of the status value type even in observation of the whole 8 bits, the bit assignment estimating device can execute monitoring and anomaly detection while regarding the field as an 8-bit status value type payload.

Further, much of practically-used hardware is architecture for processing data strings of 4- or 8-bit multiples (8, 16, 32, and 64 bits) at once. Therefore, a design of a field is ordinarily an 8-bit multiple for the sake of hardware processing efficiency, so that there is small possibility that a division pattern based on specifications is seriously different from an estimation result even if division is performed at any of the above-mentioned constants (1, 2, 4, or 8 bits) in the above-described bit assignment estimating device.

Advantageous Effects

The bit assignment estimating device according to the above-described embodiments is capable of estimating a type of a payload by statistic calculation based on block basis division which requires fewer division patterns than the related art with respect to communication, in which bit assignment of a payload is not known, on a vehicle equipment communication network, being able to reduce calculation cost required for estimation.

Further, the bit assignment estimating device according to the above-described embodiments re-estimates a type by concatenating adjacent blocks to enhance estimation accuracy for each block, being able to make it hard that a block of the continuous value type is erroneously estimated to be the status value type. Thus, bit assignment can be accurately estimated.

Furthermore, the bit assignment estimating device according to the above-described embodiments sets a threshold value based on value change characteristics of variable type to be classified, and thus, the bit assignment estimating device is capable of identifying signed continuous values of the continuous value type from unsigned continuous values though signed continuous values and unsigned continuous values have not been able to be classified in related art. Thus, bit assignment can be estimated in more detail.

Appendix

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer or an embedded device, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the component elements represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the device executing the processing or any necessity.

As already mentioned, when the processing functions of the hardware entities described in the embodiments (the devices of the present invention) are to be embodied with a computer or an embedded device, the processing details of the functions to be provided by the hardware entities are described by a program. By the program then being executed on the computer or the embedded device, the processing functions of the hardware entity are embodied on the computer or the embedded device.

The program describing the processing details can be recorded on a recording medium which can be read by a computer or an embedded device. The recording medium which can be read by the computer or the embedded device may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers or embedded devices from the server computer via a network.

The computer or the embedded device that executes such a program first, for example, temporarily stores the program recorded on the portable recording medium or the program transferred from the server computer in a storage device thereof. At the time of execution of processing, the computer or the embedded device then reads the program stored in the storage device thereof and executes the processing in accordance with the read program. Also, as another form of execution of this program, the computer or the embedded device may read the program directly from the portable recording medium and execute the processing in accordance with the program and, furthermore, every time the program is transferred to the computer or the embedded device from the server computer, the computer or the embedded device may sequentially execute the processing in accordance with the received program. Also, a configuration may be adopted in which the transfer of a program to the computer or the embedded device from the server computer is not performed and the above-described processing is executed by so-called application service provider (ASP)-type service by which the processing functions are embodied only by an instruction for execution thereof and result acquisition. Note that a program in this form shall encompass information that is used in processing by an electronic computer and acts like a program (such as data that is not a direct command to a computer or an embedded device but has properties prescribing processing of the computer or embedded device).

Further, although the hardware entity was described as being configured via execution of a predetermined program on a computer or an embedded device in this form, at least some of these processing details may instead be embodied with hardware.

What is claimed is:

1. A bit assignment estimating device that estimates bit assignment of a payload included in communication data of each electronic control unit in a communication network, the bit assignment estimating device comprising:
   processing circuitry configured to
   receive the communication data;
   divide the payload of the communication data, the communication data being received, by every predetermined fixed bit length so as to generate a plurality of blocks;
   estimate the bit assignment of the block to be any one of a fixed value type, a status value type, and a continuous value type based on a statistic of each block;
   concatenate a block, the block being adjacent to either of the block which is estimated to be the continuous value type or a concatenation block which is obtained by concatenating a plurality of adjacent blocks and estimated to be the continuous value type at a higher-order bit side, to the block or the concatenation block, the block or the concatenation block being estimated to be the continuous value type, when the block adjacent is estimated to be the status value type or the continuous value type;
   estimate whether the concatenation block is the continuous value type or not based on a statistic of each concatenation block; and
   separate an immediately-close-concatenated block from a corresponding concatenation block when the concatenation block is estimated not to be the continuous value type.

2. The bit assignment estimating device according to claim 1, wherein
   processing circuitry
      estimates whether the block is the status value type or the continuous value type based on a threshold value, the threshold value being set for at least any one of the number of kinds of unique values of the block, a rate of the number of changing times of a value of the block, and variance of differences in change amounts of a value of the block, and
      estimates whether the concatenation block is the continuous value type or not based on a threshold value, the threshold value being set for at least any one of the number of kinds of unique values of the concatenation block, a rate of the number of changing times of a value of the concatenation block, and variance of differences in change amounts of a value of the concatenation block.

3. The bit assignment estimating device according to claim 1, wherein
   when the processing circuitry estimates the block to be the continuous value type, the processing circuitry further estimates the block to be any one of an unsigned continuous value type, a signed continuous value type, a counter value type, and a checksum value type, based on a corresponding variance and a change amount used for calculation of the variance.

4. The bit assignment estimating device according to claim 1, wherein
   the processing circuitry changes a threshold value used for estimation so as to make it easier for a corresponding block to be estimated to be the status value type when a transmission period of the communication data, the communication data being received, corresponds to a predetermined pattern.

5. A bit assignment estimating method for estimating bit assignment of a payload included in communication data of each electronic control unit in a communication network, the bit assignment estimating method comprising:
   receiving the communication data;
   dividing the payload of the communication data, the communication data being received, by every predetermined fixed bit length so as to generate a plurality of blocks;
   estimating the bit assignment of the block to be any one of a fixed value type, a status value type, and a continuous value type based on a statistic of each block;
   concatenating a block, the block being adjacent to either of the block which is estimated to be the continuous value type or a concatenation block which is obtained by concatenating a plurality of adjacent blocks and estimated to be the continuous value type at a higher-order bit side, to the block or the concatenation block, the block or the concatenation block being estimated to be the continuous value type, when the block adjacent is estimated to be the status value type or the continuous value type;
   estimating whether the concatenation block is the continuous value type or not based on a statistic of each concatenation block; and
   separating an immediately-close-concatenated block from a corresponding concatenation block when the concatenation block is estimated not to be the continuous value type.

6. The bit assignment estimating method according to claim 5, wherein
   in the estimating the bit assignment of the block, whether the block is the status value type or the continuous value type is estimated based on a threshold value, the threshold value being set for at least any one of the number of kinds of unique values of the block, a rate of the number of changing times of a value of the block, and variance of differences in change amounts of a value of the block, and
   in the estimating whether the concatenation block is the continuous value type or not, whether the concatenation block is the continuous value type or not is estimated based on a threshold value, the threshold value being set for at least any one of the number of kinds of unique values of the concatenation block, a rate of the number of changing times of a value of the concatenation block, and variance of differences in change amounts of a value of the concatenation block.

7. The bit assignment estimating method according to claim 5, wherein
in the estimating the bit assignment of the block when the block is estimated to be the continuous value type, the block is further estimated to be any one of an unsigned continuous value type, a signed continuous value type, a counter value type, and a checksum value type, based on a corresponding variance and a change amount used for calculation of the variance.

8. A non-transitory computer readable medium that stores a program that makes a computer function as the bit assignment estimating device according to claim 1.

9. The bit assignment estimating device according to claim 2, wherein
when the processing circuitry estimates the block to be the continuous value type, the processing circuitry further estimates the block to be any one of an unsigned continuous value type, a signed continuous value type, a counter value type, and a checksum value type, based on a corresponding variance and a change amount used for calculation of the variance.

10. The bit assignment estimating device according to claim 2, wherein
the processing circuitry changes a threshold value used for estimation so as to make it easier for a corresponding block to be estimated to be the status value type when a transmission period of the communication data, the communication data being received, corresponds to a predetermined pattern.

11. The bit assignment estimating device according to claim 3, wherein
the processing circuitry changes a threshold value used for estimation so as to make it easier for a corresponding block to be estimated to be the status value type when a transmission period of the communication data, the communication data being received, corresponds to a predetermined pattern.

12. The bit assignment estimating device according to claim 9, wherein
the processing circuitry changes a threshold value used for estimation so as to make it easier for a corresponding block to be estimated to be the status value type when a transmission period of the communication data, the communication data being received, corresponds to a predetermined pattern.

13. The bit assignment estimating method according to claim 6, wherein
in the estimating the bit assignment of the block when the block is estimated to be the continuous value type, the block is further estimated to be any one of an unsigned continuous value type, a signed continuous value type, a counter value type, and a checksum value type, based on a corresponding variance and a change amount used for calculation of the variance.

14. A non-transitory computer readable medium that stores a program that makes a computer function as the bit assignment estimating device according to claim 2.

15. A non-transitory computer readable medium that stores a program that makes a computer function as the bit assignment estimating device according to claim 3.

16. A non-transitory computer readable medium that stores a program that makes a computer function as the bit assignment estimating device according to claim 4.

17. A non-transitory computer readable medium that stores a program that makes a computer function as the bit assignment estimating device according to claim 9.

18. A non-transitory computer readable medium that stores a program that makes a computer function as the bit assignment estimating device according to claim 10.

19. A non-transitory computer readable medium that stores a program that makes a computer function as the bit assignment estimating device according to claim 11.

20. A non-transitory computer readable medium that stores a program that makes a computer function as the bit assignment estimating device according to claim 12.

\* \* \* \* \*